(12) United States Patent
Christiansen

(10) Patent No.: US 6,923,025 B2
(45) Date of Patent: Aug. 2, 2005

(54) DEVICE FOR SINTERING A SHAPED BODY

(75) Inventor: Uwe Christiansen, Gelnhausen (DE)

(73) Assignee: Heraeus Tenevo AG, Hanau (DE)

( * ) Notice: Subject to any disclaimer, the term of this patent is extended or adjusted under 35 U.S.C. 154(b) by 507 days.

(21) Appl. No.: 10/019,102

(22) PCT Filed: Apr. 11, 2001

(86) PCT No.: PCT/EP01/04139

§ 371 (c)(1),
(2), (4) Date: Dec. 20, 2001

(87) PCT Pub. No.: WO01/81257

PCT Pub. Date: Nov. 1, 2001

(65) Prior Publication Data

US 2003/0024279 A1 Feb. 6, 2003

(30) Foreign Application Priority Data

Apr. 22, 2000 (DE) .......................................... 100 20 033

(51) Int. Cl.[7] .......................................... C03B 37/018
(52) U.S. Cl. .............................. 65/484; 65/529; 65/540
(58) Field of Search .......................... 65/377, 381, 427, 65/484, 529, 540, 486

(56) References Cited

U.S. PATENT DOCUMENTS

| 3,121,630 | A | | 2/1964 | Bussard |
|---|---|---|---|---|
| 4,552,576 | A | * | 11/1985 | Hara et al. ..................... 65/378 |
| 5,032,079 | A | | 7/1991 | Tsuchiya et al. |
| 5,259,856 | A | * | 11/1993 | Ohga et al. .................... 65/426 |
| 5,423,898 | A | * | 6/1995 | Terashima et al. ............. 65/381 |
| 6,555,048 | B1 | * | 4/2003 | Yoon et al. .................. 264/621 |

FOREIGN PATENT DOCUMENTS

| DE | 37 11 281 | 6/1988 |
|---|---|---|
| EP | 0 416 614 A1 | 3/1991 |
| EP | 0 529 694 A2 | 3/1993 |
| EP | 0 547 560 A2 | 6/1993 |
| WO | WO 93/23341 | 11/1993 |

OTHER PUBLICATIONS

Patent abstracts of Japan, vol. 17, No. 73 Feb. 15, 1993 for JP 04 275935A.
Patent Abstracts of Japan, vol. 17, No, 73 Feb. 15, 1993 for JP 04 275936A.
Patent Abstracts of Japan, vol. 11, No. 141 May 8, 1987 for JP 61 281038.
Patent Abstracts of Japan, vol. 18, No. 456 Aug. 25, 1994 for JP 06 144841A.
Patent Abstracts of Japan, vol. 16, No. 13 Jan. 14, 1992 for JP 03 232733.

* cited by examiner

Primary Examiner—John Hoffmann
(74) Attorney, Agent, or Firm—Tiajoloff & Kelly

(57) ABSTRACT

The invention concerns a device (1) for sintering of a porous mold body (2) in a gas-tight chamber (3), with the mold body (2) hanging loose from a link chain (7) so that it can be fed continuously to a heating zone (5). In the area of the upper boiler (10), the traction direction of the link chain (7) is reversed by a deviation wheel (11). The tensile force is transmitted via a traction rope (13) that can be taken up on a take-up reel (14), such take-up reel (14) being driven by a drive (16) arranged outside the chamber (3). A drive shaft (15) for the take-up reel (14) provides for easy sealing of the duct (18) towards the chamber (3), because only a rotation and not a simultaneous axial displacement is required for the hoisting movement, and moreover, because the duct (18) is arranged at a spatial distance from the heating zone (5). The link chain (7) consists of carbon fiber reinforced mineral carbon materials and is thus resistant to high temperatures, so that no contamination of the mold body (2) by released components of the material of the link chain (7) will occur.

19 Claims, 4 Drawing Sheets

DEVICE FOR SINTERING A SHAPED BODY

FIELD OF THE INVENTION

This invention concerns a device for sintering of a mold body, especially of silicon dioxide soot, in a gas-tight chamber, the device for vertical feeding of the mold body into a heating zone being equipped with a hoisting appliance extending into an inner space of the chamber through a duct, such hoisting appliance being mobile by means of a drive arranged outside of the chamber

BACKGROUND OF THE INVENTION

In the manufacture of pre-molds for optical fibers or for semiconductor engineering, intermediate products are frequently used, the silicon dioxide mold body being present as a so-called soot body. For sintering, the mold body is fed into the heating zone of a zone melting furnace in which the mold body is heated to its softening temperature; thus, the transition is initiated. Because of the high quality demands, above all with applications in communication and semiconductor engineering, sintering is done in a gas-tight chamber to reliably avoid any contaminations.

Usually, axially traveling columns are used as hoisting appliances to which the mold body is fixed upright or hanging. Such a hanging arrangement is known for example from EP-A 0,416,614, EP-A 0,529,694, and EP-A 0,547,560, in which the porous mold body is fixed hanging to a vertically or rotatingly mobile column and can thus be fed to the heating zone within the chamber which is filled with a low-reaction gas. Similarly, in U.S. Pat. No. 5,032,079 the porous mold body is fixed hanging to a vertically or rotatingly mobile column within the chamber which is filled with an inert gas, for example, nitrogen or helium.

Comparably, WO 93/23,341 A1 provides for a device for sintering with a chamber operable at ambient pressure or in a vacuum in which the mold body is arranged hanging at a vertically mobile column rotatable around its axis.

To seal the column off from the interior of the chamber, a state-of-the-art seal is provided at the duct which guarantees reliable sealing while being insensitive to the high temperatures occurring during the sintering process. With the described state of the-art, it is a disadvantage that in practice the seal is frequently subject to considerable wear, causing quick deterioration of the sealing effect, always resulting in reduced quality of the mold body after sintering.

Here, it is especially problematic that small quantities of $Cl_2$ are released during sintering which after opening the chamber to remove the mold body react on the ambient humidity to form HCl, which is aggressive to the surface of the column. When the column is moved, this increased roughness of the surface damages the seal. Accordingly, the components of the hoisting appliance require much maintenance and care and must be treated or replaced regularly, resulting in reduced availability of the appliance. If a damage to the seal is not recognized promptly, the sealing oil present in the seal can penetrate into the inside of the chamber where it will evaporate under the high temperatures, causing contaminations in the chamber which will be detectable in the final product.

Furthermore, deposits, consisting above all of $SiO_2$, occur on the surface of the section of the column extending into the interior of the chamber, which have to be removed regularly to avoid any damages and thus leakages of the duct.

The above mentioned problems occur more frequently with a hanging arrangement in which the duct is above the mold body and in which under the influence of gravity, the sealing oil can easily penetrate into the inside of the chamber; such problems cannot be avoided even with a standing arrangement of the hoisting column, as because of the relative axial movement between the hoisting column and the duct, inadmissible quantities of sealing oil penetrate into the inside of the chamber even through minor damages to the seal and will subsequently be detectable in the mold body.

SUMMARY OF THE INVENTION

With this background, the present invention is based on the task to provide for a device of the above described type with a hoisting device in the interior of the chamber operated by a drive arranged outside of the chamber in such a way that the availability of the device and the quality of the mold body manufactured in the sintering process are improved, and that above all contaminations caused by leakages at the duct are to be excluded as far as possible. At the same time, the amount of maintenance required is to be reduced.

This task is met by a device according to the characteristics of Claim 1. The Sub-Claims concern especially useful further developments of the invention.

That is to say that a device is provided in which the hoisting appliance has a drive shaft extending through the duct into the inner space of the chamber which is connected to the drive. By means of this exclusively rotating drive shaft, any damage to the duct can be essentially excluded. The section of the drive shaft extending into the inner space of the chamber does not reach the area of the duct, so that any changes of the surface condition of the drive shaft, for example, by deposits on the drive shaft, cannot come into contact with the seal and thus cannot negatively influence the operativeness of the seal. The availability of the seal is above all improved by the reduction of the required maintenance work. Besides, a section of the drive shaft contaminated with seal oil cannot reach the inner space of the chamber so that the mold body cannot be contaminated by evaporating seal oil during sintering. Accordingly, use of the known seals with a filling of seal oil can be continued, which keeps the amount of work required for the manufacture of the device comparatively low and makes it possible to retrofit existing plants, their column being used as drive shaft. In this, the drive shaft, for this purpose equipped with a thread section, a pinion or a cam, cooperates with a construction element of the hoisting appliance in the inner space of the chamber.

Here, an embodiment of the device according to the invention is especially advantageous in which the hoisting appliance has a line chain consisting of individual links in the area of the heating zone. The links of the link chain can also have an eyelet form and thus form an eyelet chain. The link or eyelet chain allows for flexible fixation of the mold body in various positions, as well as for unproblematic adjustment to various geometric dimensions of the mold body. With mold bodies of higher weight, links can furthermore be replaced or added to achieve increased carrying capacity without any work or time-intensive design changes. The mold body is fixed in a hanging position at the link or eyelet chain, the mold body being fed to the heating zone for example by linear (take-up) movement of the link chain.

The design of a further development of the device is especially useful by providing for the link chain being reversable from the vertical traction direction at the deviation space. In this way, the arrangement of the drive shaft and the duct into the inner space can take place with the relevant seal in spatial distance from the heating zone, so that the temperature in the duct area can be significantly reduced compared to the sintering temperature. Thus, the fault liability of the seal can be significantly reduced. The deviation space can for example be equipped with a gliding space so that apart from the link chain, no other movable elements are required.

In an especially useful embodiment of the invention, the links of the link chain are connected to each other in such a way that any rotation around the axis of the main extension of the link chain is essentially excluded. In this way, any unintentional and uncontrolled rotation of the mold body hanging from the link chain is prevented. Thus, undesirable uneven heating of the mold body in the heating zone, and the resulting reduction of quality, above all in rotation-unsymmetrical mold bodies, is avoided.

In another especially useful embodiment of the device according to the invention, the links of the link chain each have a fixed link or oval eyelets, such fixed links or oval eyelets being slewably connected by an axis. Thus, a high mechanic load carrying capacity of the individual links is achieved, while at the same time, rotation around the pull axis is excluded. The dimensions of the fixed links or oval eyelets are determined by the drive type and, if applicable, by the deviation of the link chain.

An embodiment of the invention has proved to be of advantage in which the link chain has individual rollers, each roller during deviation resting on the deviation space. On deviation, the rollers are rolled off on the deviation space, thus reducing the resistance of the link or eyelet chain on reversal of direction. Simultaneously, there are less detrimental influences by wear or abrasion, and the required driving power is reduced. Besides, any lateral powers affecting the links of the link chain can be excluded, so that the design of the links of the link chain is essentially determined by the tensile load to be expected. For this purpose, the links of the link chain can be equipped with two parallel outside fixed links or oval eyelets enclosing the rollers, or they can have the rollers also at their outside.

To this effect, it is especially favorable, if the height h of the fixed links or oval eyelets in their outside dimensions is set back from the roller diameter. In this way, any contact between the deviation space and the fixed link can be effectively prevented, the necessary difference between the dimensions of the fixed link or oval eyelet and the roller being determined above all by the radius of the deviation space and the distance of the rollers arranged in sequence.

In another especially favorable embodiment of the invention, the deviation space has a recess intended for the fixed links or oval eyelets. By means of these recesses, sufficient free space is created into which the fixed links or oval eyelets can engage, thus avoiding any contact between the deviation space and the fixed link. Consequently, the dimensions of the link or eyelet chain can be determined independent of the deviation, so that a potential subsequent alteration of the guiding appliance for the link chain is unproblematic. Furthermore, the recess by engagement of the fixed links prevents any lateral slipping off as well as any deviation from a given course of the link chain.

Here, it is especially recommendable to arrange the deviation space at a deviation wheel so that the frictional resistance is reduced further, and that very small deviation radii can be achieved. Such deviation wheel can be designed similar to a V-belt pulley with lateral conical sides or boards, or with convexities arranged at its circumference and adapted to the form of the links.

In another, likewise very recommendable embodiment of the device according to the invention, the deviation wheel has a chain wheel positively engaging into the rollers of the link chain. This not only prevents lateral slipping but also a potential slip of the link chain at the circumference of the deviation wheel. By grasping the changed rotation angle of the chain wheel, also the vertical position of the link chain and accordingly of the mold body can be identified. Furthermore, this prevents a transmission of lateral powers to the parallel fixed links of the chain link connected by rollers and running along both sides of the chin wheel.

Here, a simple design is realized if the deviation wheel can be driven by means of the drive shaft. For this purpose, the deviation wheel can be fastened directly at the drive shaft, thus allowing for unproblematic vertical movement of the mold body. The end of the link chain opposite the mold body can hang loose, or it can rest to a guiding appliance. Moreover, to prevent any total slip of the link chain, an end link with a different shape than that of the other links can be provided.

In another, especially reliable embodiment of the invention, the link chain by means of a traction rope is connected to a take-up reel driven by the drive shaft, the traction rope being dimensioned in such a way that it cannot get into the freely hanging section above the mold body. Accordingly, the traction rope is situated outside of the sphere of influence of the heat radiation of the heating zone; besides, any uncontrolled rotation of the mold body is prevented.

Here, an embodiment is especially recommendable in which the links of the link chain are manufactured from a tensile and temperature-resistant material. Any exhalation of material components of the link chain which might result in disadvantageous changes to the mold body is kept to a minimum.

The link chain could consist essentially of ceramic material components. In an especially favorable embodiment, however, the links are manufactured from a carbon fiber reinforced mineral carbon (a so-called CFC material). This material combines high solidity and temperature resistance with an essential level of chemical inertance to silicon dioxide soot and quartz glass. Due to the high tensile strength of carbon fiber reinforced mineral carbon, the cross section of the links can be small. The low weight of this link chain requires comparatively little driving power.

In another especially useful embodiment of the device, a force-sensing device is provided for determination of a force acting upon the hoisting appliance. Thus, any load on the link chain exceeding the permissible limit can be detected which can occur for example when the mold body gets jammed inside the chamber, so that the drive can be disconnected before any damage to the device and/or the mold body occurs. Furthermore, this embodiment provides for recognition of the point when an upper end position of the link chain is reached.

To this effect, the force-sensing device can be arranged at the drive or the drive shaft. Another embodiment has proven to be especially effective, however, in which the force-sensing device is equipped with a wire strain gauge to determine the force acting upon the deviation space. For this purpose, the wire strain gauge is arranged especially in the area of a holder element of the deviation wheel equipped with the deviation space which is for example subject to bending under load. Here, the wire strain gauge is only exposed to moderate temperatures and thus allows for reliable determination of the forces arising.

In another advantageous embodiment, the device is equipped with a guiding appliance for the link chain which precludes any slipping diagonally to the traction direction of the link chain. This prevents any oscillation of the link chain due to the fact that only the rollers of the link chain rest on the deviation surface and that accordingly a horizontal shifting can occur between the support points of the rollers. In this way, the distance between the mold body hanging from the link chain and the heating zone is kept constant, so that any uneven heating is precluded.

Furthermore, it is of advantage when the device has a catch to limit the vertical hoisting movement. In this way, any damage of the mold body by contact with the chamber or with components of the hoisting appliance is reliably excluded.

BRIEF DESCRIPTION OF THE DRAWINGS

The invention allows for numerous embodiments. To explain its basic principle in more detail, two embodiments are illustrated in the Figures and described in the following.

It is shown in

DETAILED DESCRIPTION

Figure 1:
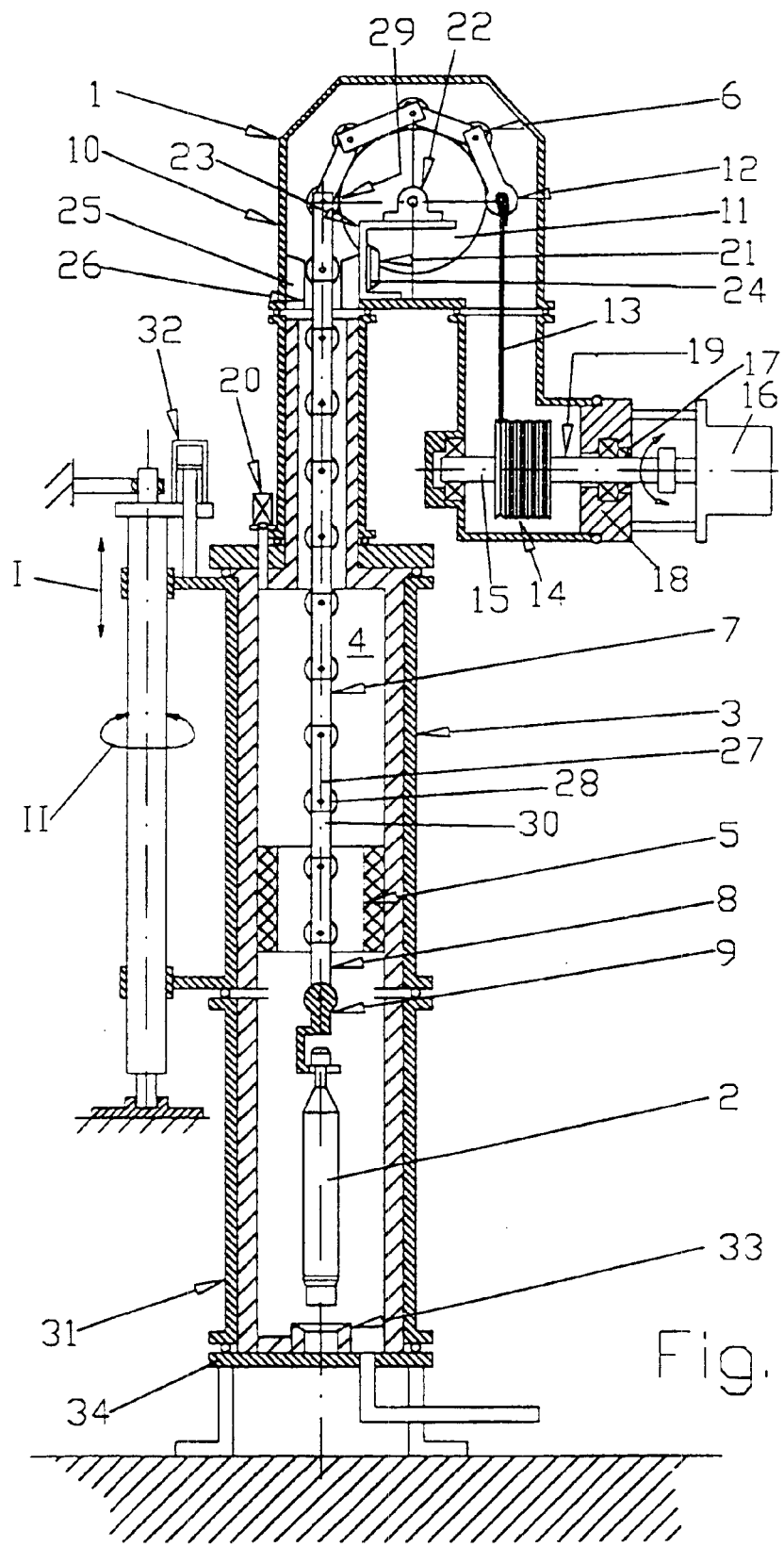
FIG. 1 a lateral sectional view of a device for sintering of a mold body, such mold body hanging from a link chain.

FIG. 1 shows in lateral sectional view a device 1 according to the invention for sintering of a porous mold body 2. As an elementary component, device 1 contains a gas-tight chamber 3, in the inner space 4 of which chamber 3 the mold body 2 can be continually fed vertically to a heating zone 5. This is effected by means of a hoisting appliance 6 with a link chain 7, the bottom end 8 of the latter having a rest 9 for the mold body 2. In the area of the upper boiler 10 of the chamber 3, the direction of the link chain 7 is reversed by means of a deviation wheel 11, the free end 12 of the link chain 7 opposite the mold body 2 being equipped with a traction rope 13. This traction rope 13 can easily be taken up on a winding appliance in the form of a take-up reel 14, thus allowing for the desired lifting movement of the mold body 2. The take-up reel 14 is flanged to a drive shaft 15 which is directly connected to a drive 116 arranged outside of the chamber 3. To seal the drive shaft 15 off from the inner space 4 of the chamber 3, a duct 18 with a seal 17 is provided. Contrary to the commonly used state-of-the-art axially traveling column, the exclusively rotating drive shaft 15 allows for the inner space 4 of the chamber 3 to be sealed off from the environment without any problems. Accordingly, any deposits on the surface of the section 19 of the drive shaft 15 extending into the inner space 4 do not cause leakages as section 19 cannot get into the seal 17. Furthermore, the spatial separation of the heating zone 5, that can be controlled by means of an optical temperature-sensing device 20, on the one hand, and the take-up reel 14 on the other hand, provide for a comparatively simple reduction of the occurring temperatures, resulting in higher process reliability.

Furthermore, the device 1 is equipped with a force-sensing device 21, which records any overload of the link chain 7, so that any damage to the device 1 or the mold body 2 can be avoided. For this purpose, the deviation wheel 11 by means of a bedding 22 is fastened to a support 23 designed as a bending bar, such support 23 being equipped with a strain control strip 24. In this way, the device registers, for example, any reaching of a maximum lifting height, in which the rest 9 of the mold body 2 hits a catch 25, and the drive 16 is disconnected in due time. At the same time, the catch 25 is equipped with a guiding appliance 26 for the link chain 7 which prevents any deviation of the otherwise freely hanging link chain 7 diagonally to the vertical traction direction, so that the desired lateral position of mold body 2, above all in the area of the heating zone 5, is maintained. To reduce the frictional resistance of the link chain 7 in the lifting process, the individual chain links 27 are equipped with rollers 28 which can roll on a deviation space 29 of the deviation wheel 11. Here, the diameter of the rollers 28 in relation to the height of the fixed links 30 of the links 27 projects in such a way that any contact between the fixed links 30 and the deviation space 29 of deviation wheel 11 is precluded, and that accordingly any damaging lateral powers acting upon the fixed links 30 are avoided.

In the operative position as represented, the mold body 2 already hangs freely from the rest 9 of the link chain 7 on the level of a lower boiler 31. Prior to starting the sintering process, the upper boiler 10 must first be lifted by means of a hydraulic hoisting equipment 32 (arrow I) and to swivel it to the side (arrow II) to place the mold body 2 by means of another, not represented hoisting appliance into a centering ring 33 of the floor flange 34 Then, the upper boiler 10 is swiveled over the mold body 2 (but not lowered), and the link chain 7 is let down in such a way that the mold body 2 can be manually connected to the rest 9. After that, the mold body 2 is lifted so far that it will not sit again on the centering ring 33 even during the subsequent lowering of the upper boiler 10 onto the lower boiler 31. By means of a vacuum pump (not represented), the inner space 4 of the chamber 3 is then evacuated so that the sintering process can be started.

Figure 2:
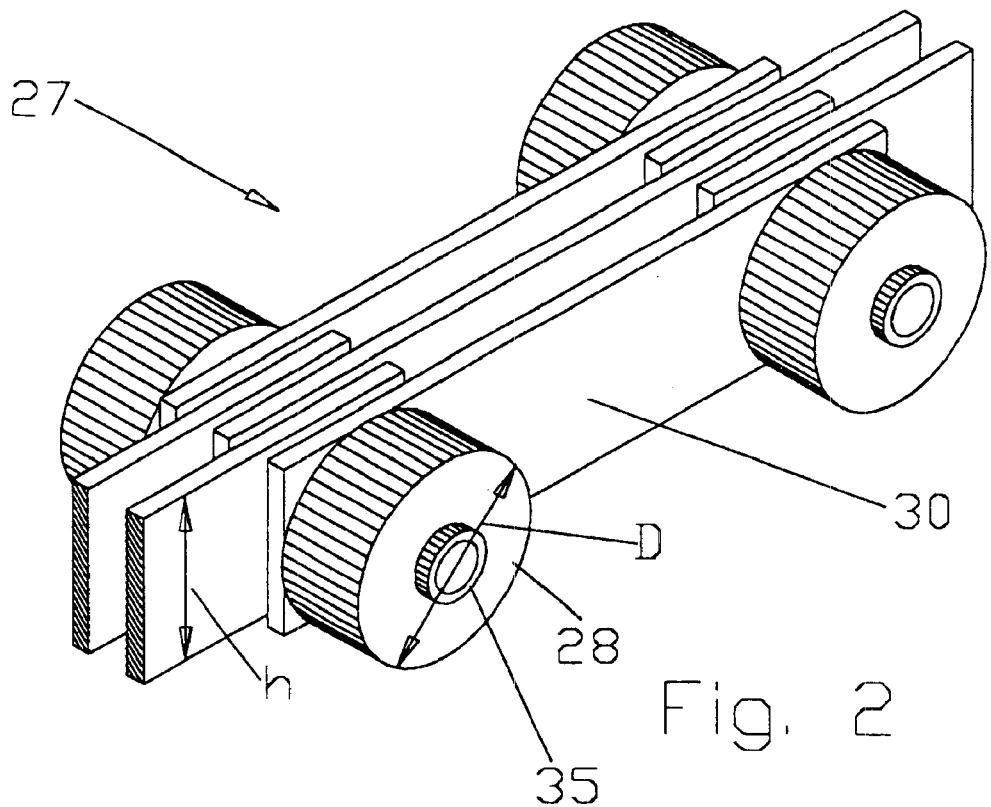
FIG. 2 an enlarged perspective view of a section of the link chain represented in FIG. 1.

The design structure of the link chain 7 is explained in detail by means of a perspective view in FIG. 2. It shows a section of the link chain 7 with the rollers 28 arranged in pairs on a common axis 35, such rollers 28 including several parallel fixed links 30 in misaligned (interlocked) arrangement. Because of the high temperatures required in the sintering process, the modules of the link chain 7 are manufactured from a tensile and temperature-resistant material, especially favorably from carbon fiber reinforced mineral carbons. To counteract any damage to the fixed links 30 by inadmissible lateral forces, the diameter D of the rollers 28 in relation to the height h of the fixed links 30 is determined in such a way that any contact of the fixed links 30 and the deviation space 29 of the deviation wheel shown in FIG. 1 is precluded.

Figure 3:
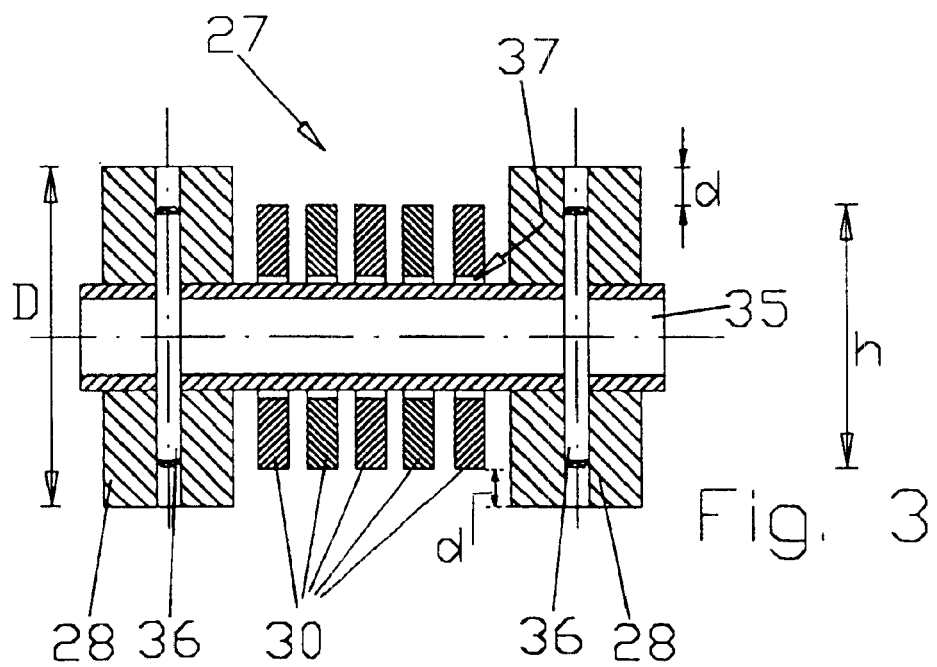
FIG. 3 an enlarged representation of the link chain shown in FIG. 1, in a sectional view diagonally to the traction direction.

This difference d between the diameter D of the rollers 28 and the height h of the fixed links 30 is also made evident in FIG. 3. The geometry of the rollers 28, projecting in relation to the fixed links 30, is visible, each of such rollers 28 being fastened on the common axis 35 by means of a pin 36. At their ends, the fixed links 30 have an opening 37, through which the axis 35 is led allowing for rotation movement. Other than in the illustrated embodiment, the fixed links 30 can also have a different material thickness to balance the alternatingly different number of fixed links 30 of one link 27, and thus the different maximum traction strength. In the illustrated design, the individual links 27 connected to each other by the axis 35 have only freedom enough to swivel around the axis 35 so that any undesirable rotation or oscillation around its longitudinal axis of the mold body 2 hanging freely as shown in FIG. 1 is essentially excluded.

Figure 4:
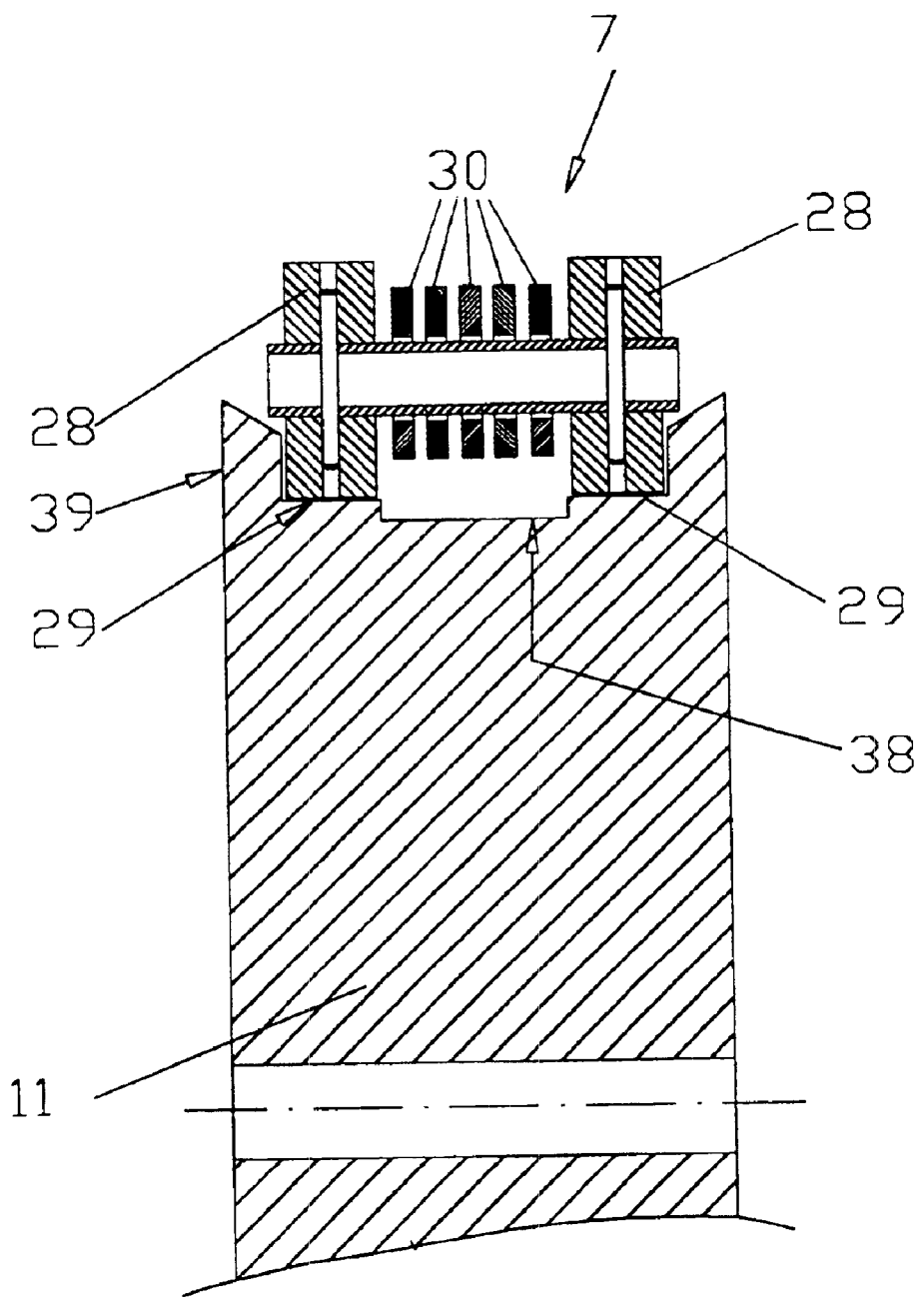
FIG. 4 an enlarged sectional view of a deviation wheel of the device shown in FIG. 1.

FIG. 4 shows the deviation wheel 11 shown in FIG. 1 in a sectional view along the axis level. A recess 38 arranged centrally at the circumference and designed as a groove around all the circumference is visible which is followed at both sides by the deviation space 29, designed as a support space, with its boards 39. The rollers 28 of the link chain 27 rest on the deviation spaces 29, so that a low-friction lifting movement of the link chain 27 is realized. Here, the boards 39 prevent any lateral slipping of the link chain 27 from the deviation wheel 11. Any contact between the fixed links 30 and the deviation wheel and a resulting inadmissible bending load is avoided by the recess 38.

It is also possible without any problems to provide for the diameter of the rollers to be corresponding to the height of the fixed links, contrary to the embodiment as illustrated, by designing the recess accordingly.

Figure 5:
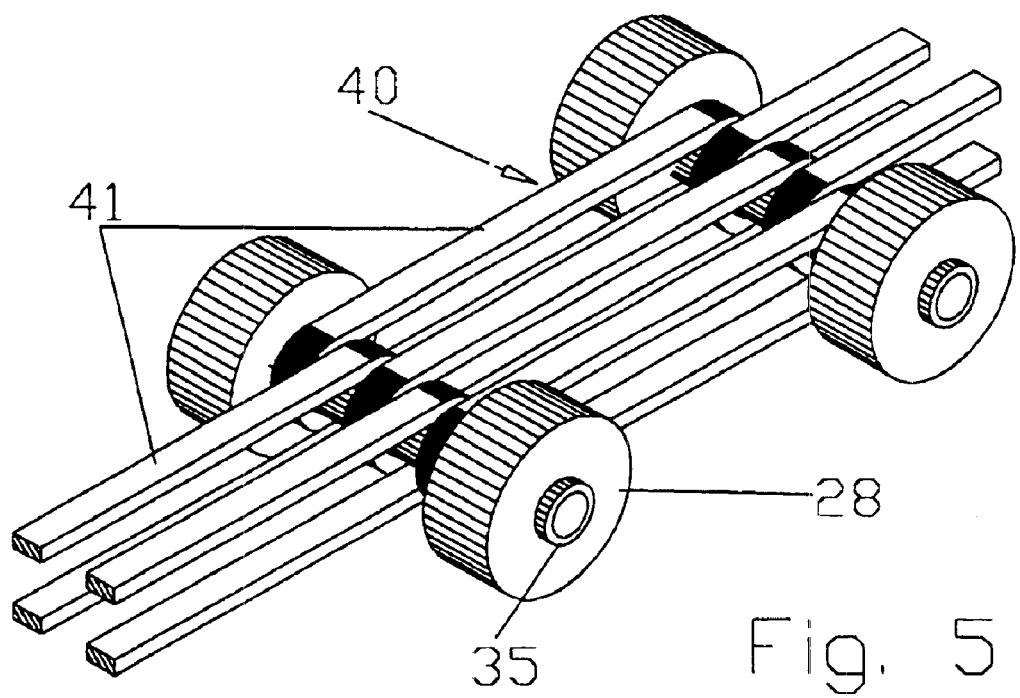
FIG. 5 a perspective view of a link chain in an embodiment different from the type shown in FIG. 2.
Figure 6:
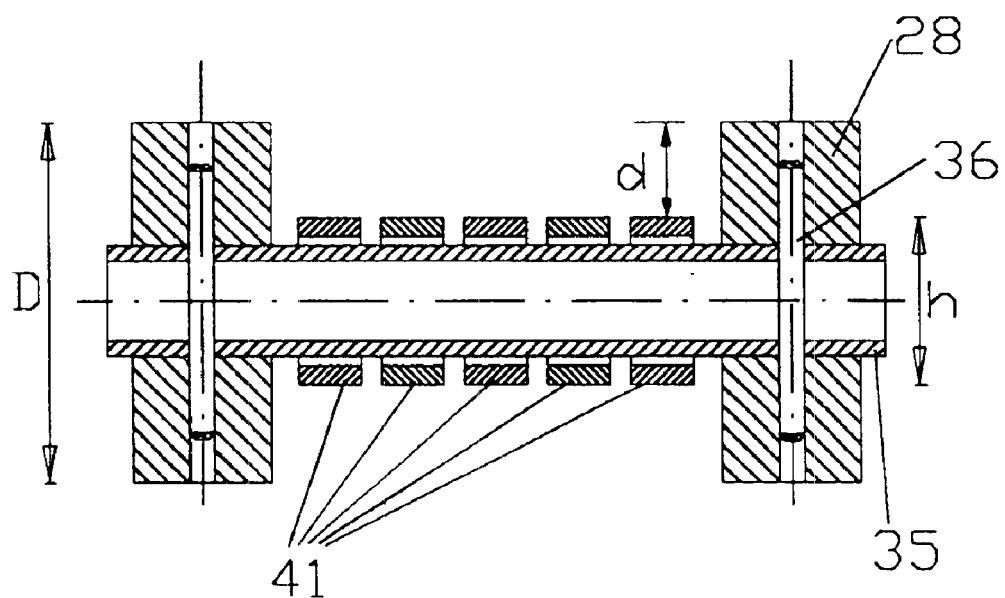
FIG. 6 a sectional view of the link chain shown in FIG. 5.

In FIG. 5, a modified design of a section of a link chain is shown which is formed as an eyelet chain 40, which is shown in more detail referring to FIG. 6. Here, The eyelet chain 40 comprises oval eyelets 41 which consist of tube sections, which allow not only for simple manufacture but also for an optimum adaptation to the required tensile strength of the eyelet chain 40. Furthermore, the oval eyelets 41 manufactured from a carbon fiber reinforced mineral carbon material are connected to each other so that they run easily, the rollers 28 of mineral carbon being pressed on to the axes 35 and fastened by means of the pins 36 For the geometric dimensions of the oval eyelets 41 in relation to the rollers 28, the principles explained by example of the FIGS. 2 to 4 apply accordingly. As can be seen especially well in FIG. 6, the diameter D of the rollers 28 projects in relation to the oval eyelets 41, while the height h of the oval eyelet 41 is reduced. The staggered arrangement of the oval eyelets 41 allows for a design of the link chain in the form of the eyelet chain 40 which in itself is dimensionally stable, while the width of such link chain is essentially optional.

This invention is not limited to the embodiments represented in the drawing. Thus, a single roller can be enclosed by one fixed link each at the outer side so that a deviation wheel, designed as a chain wheel for this purpose, engages with its teeth into the free spaces between the consecutive rollers. Thus, any lateral sliding off and any potential slip between the deviation wheel and the link chain are avoided.

| List of reference numbers | |
| --- | --- |
| 1 | device |
| 2 | mold body |
| 3 | chamber |
| 4 | inner space |
| 5 | heating zone |
| 6 | hoisting appliance |
| 7 | link chain |
| 8 | bottom end |
| 9 | rest |
| 10 | upper boiler |
| 11 | deviation wheel |
| 12 | free end |
| 13 | traction rope |
| 14 | take-up reel |
| 15 | drive shaft |
| 16 | drive |
| 17 | seal |

| -continued | |
| --- | --- |
| List of reference numbers | |
| 18 | duct |
| 19 | section |
| 20 | temperature-sensing device |
| 21 | force-sensing device |
| 22 | bedding |
| 23 | support |
| 24 | strain control strip |
| 25 | catch |
| 26 | guiding appliance |
| 27 | link |
| 28 | roller |
| 29 | deviation space |
| 30 | fixed link |
| 31 | lower boiler |
| 32 | hoisting equipment |
| 33 | centering ring |
| 34 | floor flange |
| 35 | axis |
| 36 | pin |
| 37 | opening |
| 38 | recess |
| 39 | board |
| 40 | eyelet chain |
| 41 | oval eyelets |
| D | diameter |
| h | height |
| d | difference (D-h)/2 |
| I | hoisting direction |
| II | swiveling direction |

What is claimed is:

1. A device for sintering of a silicon dioxide soot body, said device comprising:

a gas-tight chamber having an inner space therein and a duct communicating therewith and a heating zone in the inner space; and a device for vertical feeding of the mold body into the heating zone, said vertical feeding device having a hoisting apparatus extending into the inner space of the chamber through the duct, said hoisting apparatus being movable by means of a drive arranged outside of the chamber;

the hoisting apparatus having a drive shaft extending through the duct into the inner space of the chamber, said drive shaft being connected to the drive; and wherein the hoisting apparatus has a link chain having individual links.

2. A device according to claim 1, wherein the link chain deviates from a direction of vertical traction by contact with a deviation structure.

3. A device according to claim 2, wherein the links of the link chain are connected to each other so as to prevent relative rotation thereof around a longitudinal axis of the link chain.

4. A device according to claim 2, wherein each link of the link chain includes a fixed link or eyelet, said fixed links or eyelets being movably connected by a pin.

5. A device according to claim 4, wherein the link chain has individual rollers, each roller on deviation being supported on the deviation structure.

6. A device according to claim 5, wherein the rollers each have a diameter and the fixed links or eyelets have external heights that are smaller than the diameter of the rollers.

7. A device according to claim 5, wherein the deviation structure has a recess therein which receives therein the fixed links or eyelets spaced from the deviation structure so as not to engage therewith.

8. A device according to claim 2, wherein the deviation structure comprises a deviation wheel.

9. A device according to claim 8, wherein the deviation wheel has a chain wheel positively engaging into the link chain.

10. A device according to claim 9, wherein the deviation wheel is driven by means of the drive shaft.

11. A device according to claim 1, wherein the links of the link chain are connected to each other so as to prevent relative rotation thereof around a longitudinal axis of the link chain.

12. A device according to claim 1, wherein each link of the link chain includes a fixed link or eyelet, said fixed links or eyelets being movably connected by a pin.

13. A device according to claim 1, wherein the link chain is connected through a traction rope to a take-up reel driven by means of the drive shaft.

14. A device according to claim 1, wherein the links of the links chain are of a tensile and temperature-resistant material.

15. A device according to claim 1, wherein the links are of a mineral carbon material reinforced by carbon fiber.

16. A device according to claim 1, wherein a force-sensing device determines a force acting upon the hoisting apparatus.

17. A device according to claim 16, wherein the link chain deviates from a direction of vertical traction by contact with a deviation structure, and the force-sensing device has a strain control strip to determine the force acting upon the deviation structure.

18. A device according to claim 1, wherein the device includes a guiding appliance for the link chain which prevents deviation diagonally to a traction direction of the link chain.

19. A device according to claim 1, wherein the device includes a catch limiting vertical movement of the link chain.

* * * * *